(12) United States Patent
Meirana

(10) Patent No.: US 6,688,362 B1
(45) Date of Patent: Feb. 10, 2004

(54) MULTI-FUNCTIONAL PRESS FOR WELDING PLASTICS TUBES

(76) Inventor: Giovanni Meirana, Via Patrioti, 27 R, 17020 Borghetto S. Spirito (SV) (IT)

( * ) Notice: Subject to any disclaimer, the term of this patent is extended or adjusted under 35 U.S.C. 154(b) by 0 days.

(21) Appl. No.: 10/111,163
(22) PCT Filed: Oct. 16, 2000
(86) PCT No.: PCT/IT00/00415
§ 371 (c)(1), (2), (4) Date: Apr. 19, 2002
(87) PCT Pub. No.: WO01/28758
PCT Pub. Date: Apr. 26, 2001

(30) Foreign Application Priority Data

Oct. 22, 1999 (IT) ........................ RM99A0648

(51) Int. Cl.⁷ .............................................. B29C 65/20
(52) U.S. Cl. .................... 156/499; 156/158; 156/304.2; 156/304.6; 156/503
(58) Field of Search ............................. 156/158, 304.2, 156/304.6, 499, 503, 580, 581

(56) References Cited

U.S. PATENT DOCUMENTS 3,552,265 A * 1/1971 Lucas ............................. 90/21
4,008,118 A * 2/1977 Wesebaum et al. ......... 156/499
4,793,880 A * 12/1988 Shaposka et al. ........... 156/158
5,158,630 A * 10/1992 Shaposka et al. ........... 156/158
5,241,157 A * 8/1993 Wermelinger et al. ...... 219/243

* cited by examiner

Primary Examiner—James Sells
(74) Attorney, Agent, or Firm—Dann, Dorfman, Herrell and Skillman, P.C

(57) ABSTRACT

The invention relates to a multi-functional press for welding plastic tubes and joints particularly polyethylene, polypropylene, polybutene and polyvinyldifluoride tubes and joints, comprising a first fixed base and a second base, movable with respect to said first base along sliding guides, a first vise group, mounted on said first base and a second vise group mounted on said second base, a thermo-element, provided on a guide parallel with respect to said first and second base and coupled with said guide in such a way to be provided in a working position between said vise groups, and in a rest position, completely out of the operation field of said vise groups, and in a lowered position with respect to the operation field of said vise groups.

10 Claims, 6 Drawing Sheets

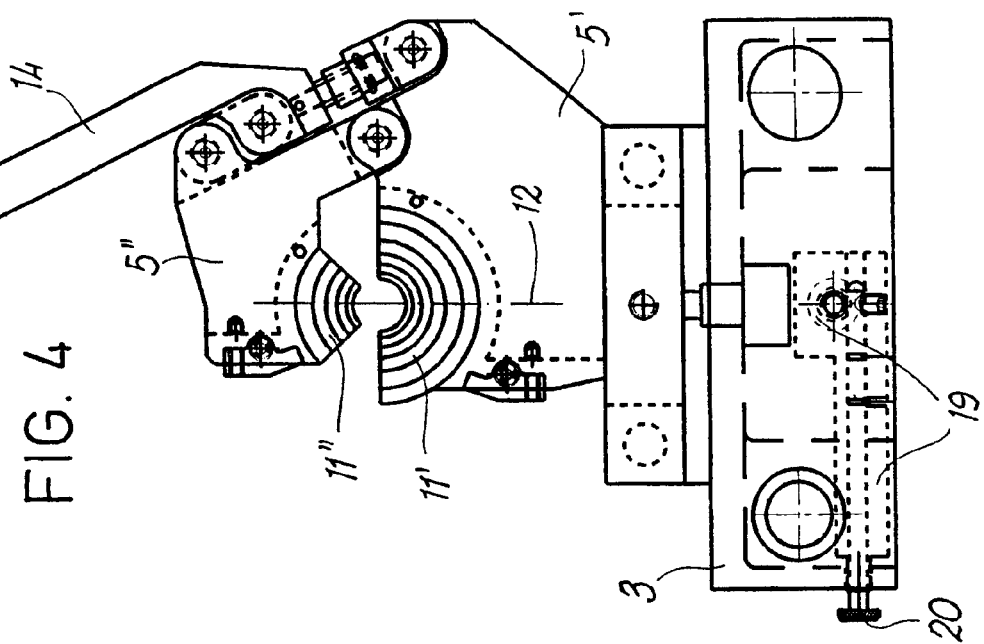

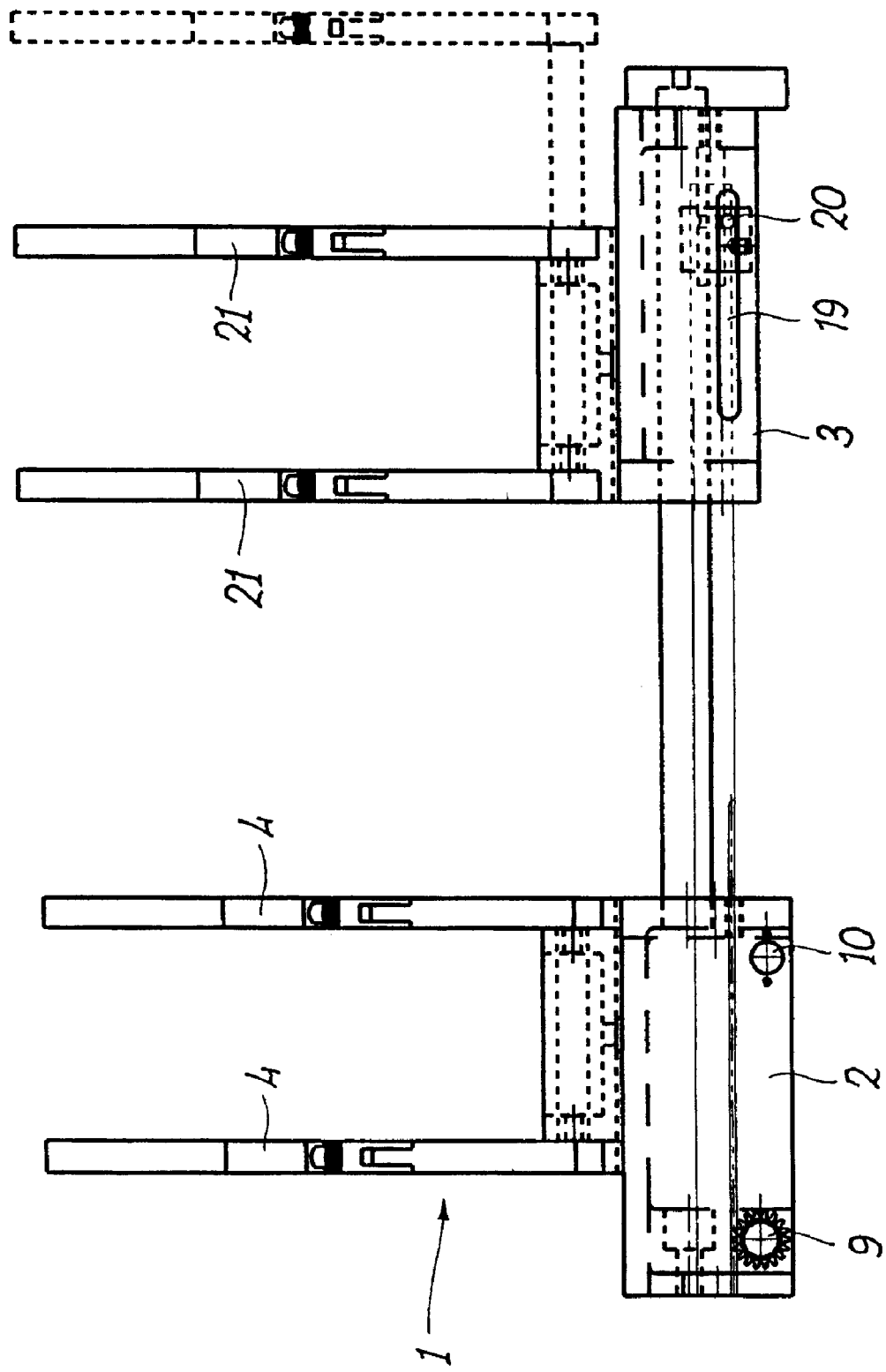

MULTI-FUNCTIONAL PRESS FOR WELDING PLASTICS TUBES

The present invention relates to a multi-functional press for welding plastic tubes and joints, particularly polyethylene PE, polypropylene PP, polybutene PB and polyvinyldifluoride PVDF tubes and joints.

More specifically, the invention concerns a press of the above kind, usable on a bench either in a workshop or directly with the building yard, said press being useful both for discharge systems and pressure systems.

As it is well know, the problem of welding plastic tubes, and particularly welding of deviation joints and special pieces on a main duct, independently from the dimensions, is extremely felt since the worker would always like to easily carry out optimum and perfectly aligned and concentric weldings.

In fact, there exist on the market bench apparatuses to carry out this kind of welding, none of them being able to easily guarantee a coaxial and perfectly aligned welding.

Until a certain period, this kind of imprecision, that can be partially compensated for by the experience of the operator, even if it is a drawback, was deemed to be not resolvable, particularly for short derivations directly coupled on the flank of a tube, since the weldings were intrinsically defective.

In fact, before the filing of the Italian patent N°1,231,685, of May 18, 1989, originally filed in the name of the same Applicant, reduction derivations had a circular cross-section, so that weldings obtained were in any case defective.

By the structure of the new joints described and claimed in said Italian patent, presently sold by MKM S.r.l., it has been made it possible to obtain structurally perfect weldings, but in this case, apparatuses presently available do not allow to exploit at best the joint features.

On the other hand, there exist on the market apparatuses solely studied to make head weldings providing a fixed vise and a vise movable on a base, between which the fusion mirror and the milling machine are introduced, according to the working step.

The present invention relates to a multi-functional press for welding plastic tubes and joints, particularly polyethylene (PE), polypropylene (PP), polybutene (PB) and polyvinyldifluoride (PVDF) tubes and joints.

More specifically, the invention concerns a press of the above kind, usable on a bench either in a workshop or directly with the building yard, said press being useful both for discharge systems and pressure systems.

As it is well know, the problem of welding plastic tubes, and particularly welding of deviation joints and special pieces on a main duct, independently from the dimensions, is extremely felt since the worker would always like to easily carry out optimum and perfectly aligned and concentric weldings.

In fact, there exist on the market bench apparatuses to carry out this kind of welding, none of them being able to easily guarantee a coaxial and perfectly aligned welding.

Until a certain period, this kind of imprecision, that can be partially compensated for by the experience of the operator, even if it is a drawback, was deemed to be not resolvable, particularly for short derivations, directly coupled on the flank of a tube, since the weldings were intrinsically defective. In fact, before the filing of the Italian patent No. 1,231,685, of May 18, 1989, originally filed in the name of the same Applicant, reduction derivations had a circular cross-section, so that weldings obtained were in any case defective.

By the structure of the new joints described and claimed in said Italian patent, presently sold by MKM S.r.l., it has been made it possible to obtain structurally perfect weldings, but in this case, apparatuses presently available do not allow to exploit at best the joint features.

On the other hand, there exist on the market apparatuses solely studied to make head weldings providing a fixed vise and a vise movable on a base, between which the fusion mirror and the milling machine are introduced, according to the working step.

Said apparatuses, that can be used only for the head weldings, have functionality limits, one of which is maintaining perfectly concentric or aligned the two ends to be welded (co-axiality and concentricity).

Another problem of this kind of apparatus is that both the mirror and the milling machine remain within the ray of action of the apparatus, thus not allowing free working, a particularly important consideration when tubes already provided with derivations are worked, and more particularly in case of multiple and/or opposed and close each other derivations, and with part of already lengthened sections.

Thus, different kinds of weldings exist that should be carried out, on the basis of the presently available techniques, employing different apparatuses.

In fact, besides the realisation of the head weldings for pre-pressed tubes or special pieces, and to the realisation of the derivation weldings employing the above mentioned MKM joints, inclined weldings, and parts of sectors to make curves, are realised; and in the poly-fusion technique the so called socket and pocket weldings.

To realise the above, the operator should be provided with a plurality of apparatuses that besides the costs problem, are not practical, particularly when realising them directly with the building yard.

EP 0543903 describes an apparatus according to the pre-characterising portion of claim 1.

In view of the above, the applicant has realised a multi-functional universal press that is able to carry out all the above mentioned operations in a single apparatus.

It is therefore a specific object of the present invention to provide a multi-functional press for welding plastic tubes and joints, particularly polyethylene (PE), polypropylene (PP), polybutene (PB), and polyvinyldifluoride (PVDF) tubes and joints, comprising a first fixed base and a second base, movable with respect to said first base along sliding guides, a first vise group, mounted on said first base and a second vise group mounted on said second base, characterised in that it further provides a thermo-element, provided on a guide parallel with respect to said first and second base, and coupled with said guide in such a way to be provided in a working position between said vise groups, and in a rest position, completely out of the operation field of said vise groups, and in a lowered position with respect to the operation field of said vise groups, and in that said vise groups are mounted on the relevant fixed and movable base, in such a way to be also able to rotate and to take every orientation with respect to the base axis.

According to the invention on said guide parallel to said first and second base a milling machine can be provided, in the same way of said first element.

Preferably, according to the invention, means are provided indicating the orientation of the vise group with respect to the relevant base.

Still according to the invention, said vise groups each have a pair of vises, said vises of each group being movable relative to each other to vary the distance between the two vises of each base.

Still according to the invention, said vise group mounted on said movable bases can provide a single vise, and a drilling machine, provided at the back with respect to the vise, to drill the main tube on which a derivation is welded.

Always according to the invention, every vise of said groups will provide two openable and closable asymmetric parts, in each of said semiparts being provided an eccentric adapter, to adapt to the specific tube under work, maintaining the surface of the tube in a constant and well aligned position.

Furthermore, according to the invention, in case a socket welding is carried out, an adapter suitable to support the socket or pocket element will be provided on the inner vise of the vise group provided on the movable base.

Still according to the invention, approaching and moving away means will be provided on said fixed base, for moving the movable base, as well fixing means will be provided to fix the movable base in the proper position, buckling elastic means being provided on said movable base, said means determining the loading pressure for the head weldings, and pin means to exclude said buckling elastic means when carrying out socket or pocket weldings.

According to the invention, said thermo-element can be a mirror or polifusion element, provided with a thermocouple electronic control, said thermo-element being interchangeable without being necessary to replace the support and the control system.

Furthermore, according to the invention, the press can provide a drawer to place the fittings.

The present invention will now be described, for illustrative but not limitative purposes, according to its preferred embodiments, with particular reference to the figures of the enclosed drawings, wherein:

FIG. 3 is a second lateral view of the press of FIG. 1;

FIG. 4 is a third lateral view of the press of FIG. 1;

FIG. 5 shows a front view of a press according to the invention in a second embodiment;

Figure 1:
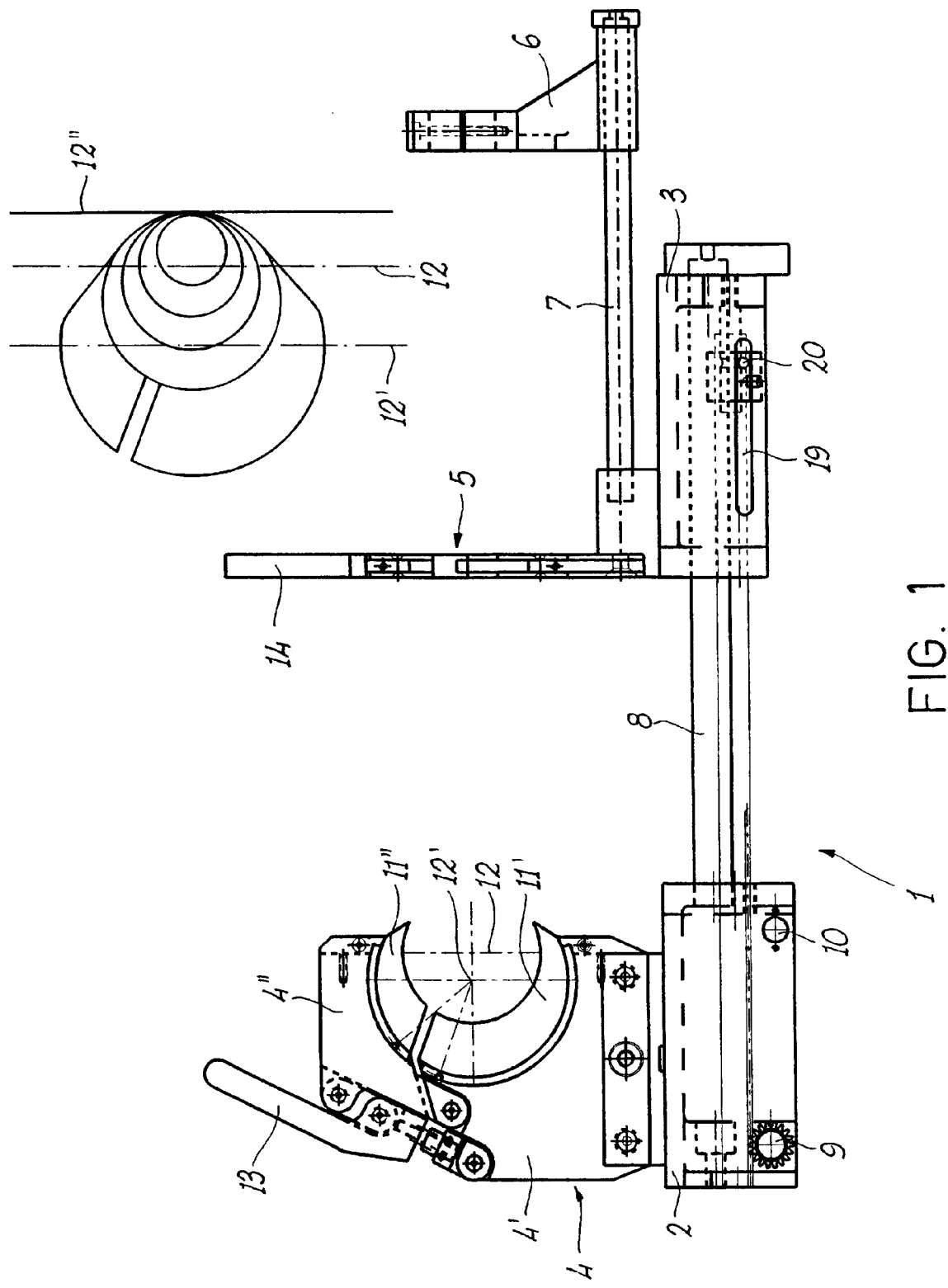
FIG. 1 is a front view of a press according to the invention according to a first embodiment.

In the following, making reference to the figures of the enclosed drawings, it will described a multi-functional bench according to the invention, which is particularly suitable to be used with the building yard, to weld plastic tubes and joints, particularly PE, PP, PB, PVDF tubes and joints.

Even if not shown in the figures, the bench according to the invention can be provided with a drawer to contain fittings, and a thermocouple temperature electronic control. Furthermore, it is provided a quick interchangeability of the kind and model of thermo-element according to the specific use, without the need of replacing the support and the control system of the same, this opportunity not being possible with the present apparatuses.

As it will be described in greater detail in the following, the press according to the invention provides a movable base with rack system, a support of the thermo-element on a guide, on which it can slide according to longitudinal and transversal direction and adjustable in different positions, as well as a double speed milling machine, slidable on a transversal support, being it possible to adjust the same on different centering positions with respect to the tube or joint axes.

Coming now to particularly observe FIGS. 1–4, it is particularly shown the press 1 according to the invention, in a first embodiment, i.e. to weld lateral joints, particularly, but not exclusively, of the MKM kind on a main tube.

Press 1 provides two bases 2, 3, on which there are mounted a pair of vides 4, and a vise 5, respectively, the latter being placed at 90° with respect to said pair of vises 4.

The support 6 for a drilling machine (not shown) is provided at the back to said vise 5, slidable along a guide 7, to bring it in a working position any time it is necessary.

Base 2 is fixed, while base 3 can slide with respect to the base 2 along the guides 8. It is provided a movement knob 9, as well as a blocking knob 10 for the operative position.

The main tube (not shown) is fixed on the vises 4, while the joint (not shown) is fixed on the vise 5.

As it can be noted particularly from FIG. 1 and FIG. 4, each vise 4, 5 provides eccentric adapters 11', 11" allowing to adapt the press to every combination of the diameter of the main tube and of the diameter of the joint, translating the axis of the tube in different positions 12, 12', maintaining the side of the tube on the same welding line 12" (system providing eccentric adapter, translation of the centre but not of the welding line, for the lateral welding derivations; see particular A of FIG. 1), and without modifying the welding axis of the vise 5, shown in FIG. 4 by the numeral reference 12". Said vises 4, 5 are each comprised of two parts 4', 4" and 5', 5", openable and closable by the handle 13, 14, respectively.

Figure 2:
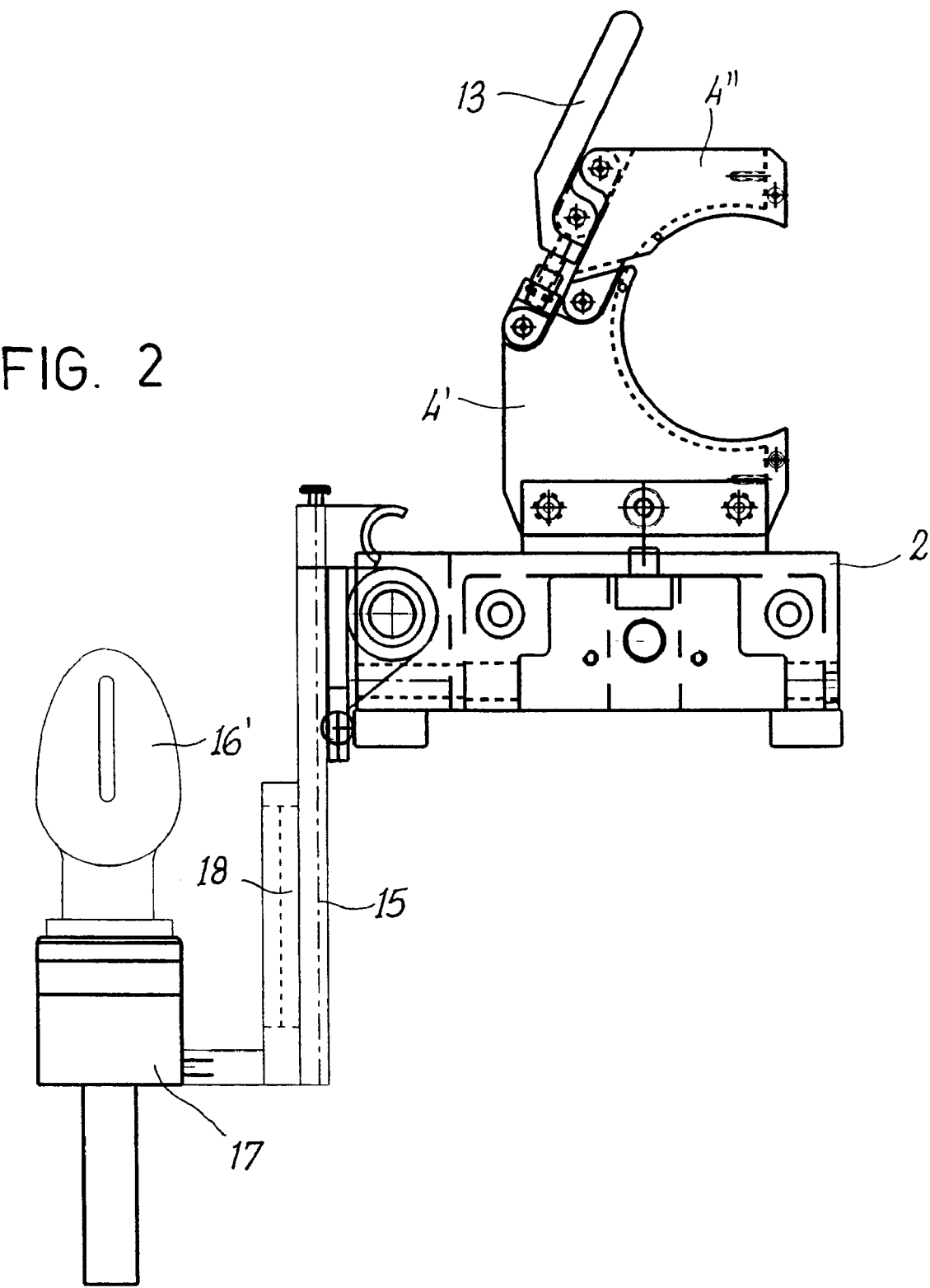
FIG. 2 is a lateral view of the press of FIG. 1, with the vises rotated of 90°.

On the press 1 shown in FIGS. 1–4 it is further mounted a support 15 for the heating element 16, that in FIGS. 2 and 3 is shown of the different kind, to demonstrate that the solution according to the present invention allows to change said element 16 according to the specific needs. Said heating element 16 is provided with a control system 17, not being necessary to replace said system in case the heating element 16 is changed.

Near the support 15 it is further mounted a support system (not shown) supporting a milling machine (not shown).

Figure 6:
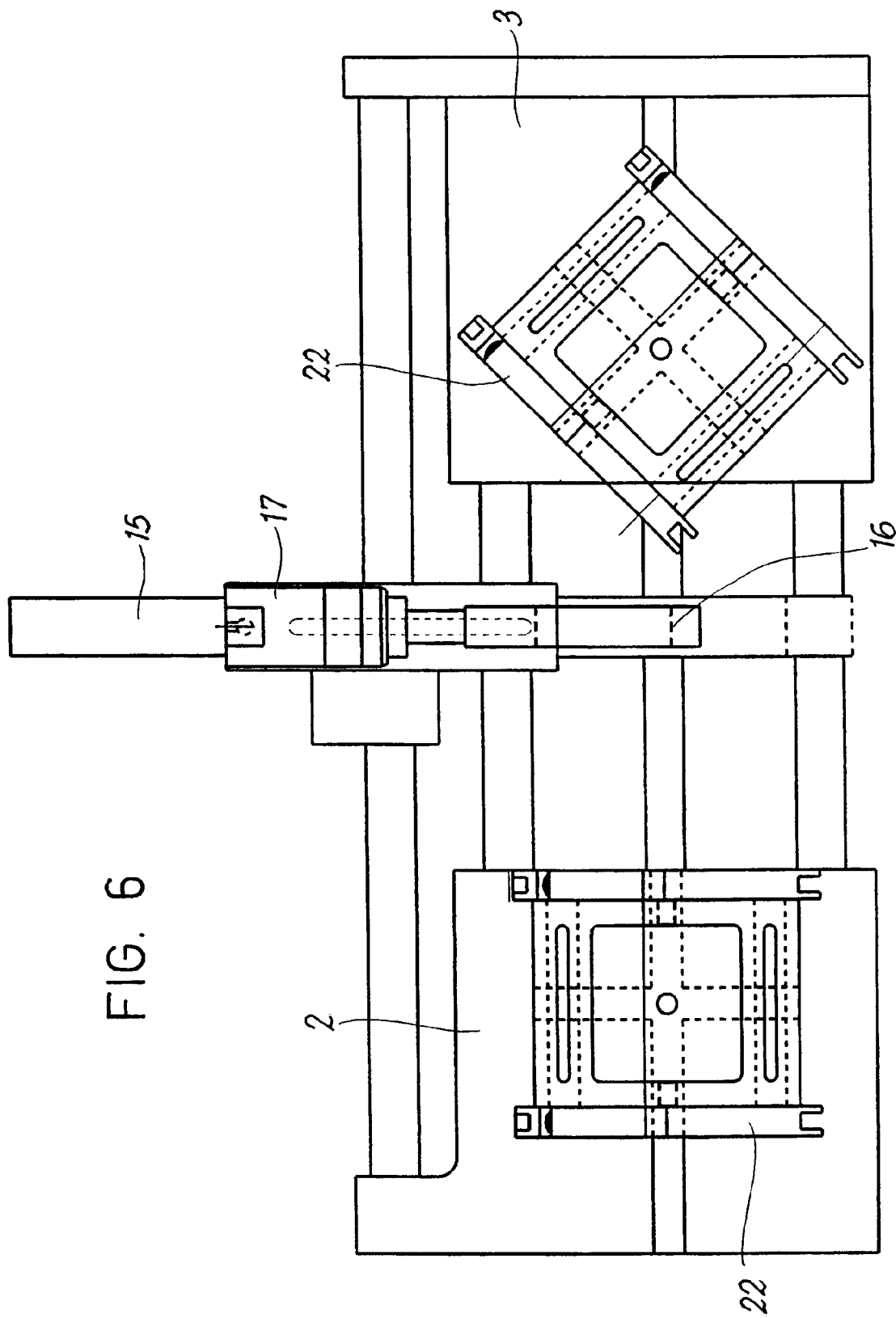
FIG. 6 is a plan view of a press according to the invention in a third embodiment.

Both supports of heating element 16 and of milling machine (not shown) are provided on the press 1 according to the invention in such a way to disappear in case they are not used (see FIG. 2) and to be brought into a utilisation position, perfectly aligned with the tube or joint provided on the vise 5 to be welded or on the vises 4 to follow the de-centering of the tubes according to the diameters when the vises 4 are rotated of 90° to make a head welding (FIG. 5) and/or for sector weldings (FIG. 6). Said supports 15 and the one not shown for the milling machine are further provided with an adjustment 18 of the position of the specific tool with respect to the centre of the tube to be welded.

Said movable base 3 is further provided with a system 19 that, along its run approaching to the base 2, eliminates the spring effect by the introduction of the pin 20 (FIGS. 1 and 4) to exclude said system 19, in case a socket or pocket welding is carried out (as will described in greater detail in the following).

Milling machine (not shown) and the thermo-element 16 are thus adjustable also along the axis transversal with respect to the sliding guides 8 and when they are not used are lowered on the rear side of the press 1 without encumbering the working zone.

Coming now to observe FIG. 5, it can be noted the press 1 according to the invention in the configuration allowing the head welding.

In this case, on the movable base 3 a second pair of vises 21 is mounted, which is substantially identical to the vises 4. Both vises 4 and vises 21 can be moved in such a way to adapt to different length of the tube to be welded (not shown).

Press 1 according to the invention allows to carry out head weldings, with precisely aligned and centred welding ends thanks to the double vises 4 and 21 provided on the two working basis 2, 3 of the machine.

As already said in the preceding, in every pair of vises 4, 21, one of them (the one provided external with respect to the working planes), can be placed and blocked at a distance different with respect to the other one. The above possibility, along with the blocking of the tube and of the joints on eccentric reductions, makes it easier to carry out weldings that are usually difficult to be realised employing concentric tightening systems.

As it can be noted from FIG. 6, supports 22 of the vises 4, 5 or 21, are provided with a graduated scale, and can rotate between positions ranging from 0° to 90°, and allow to carry our weldings for sector curves or other inclined weldings in a very precise way.

This opportunity further allows to carry out 45° derivations, or derivations having a different angulation.

Figure 7:
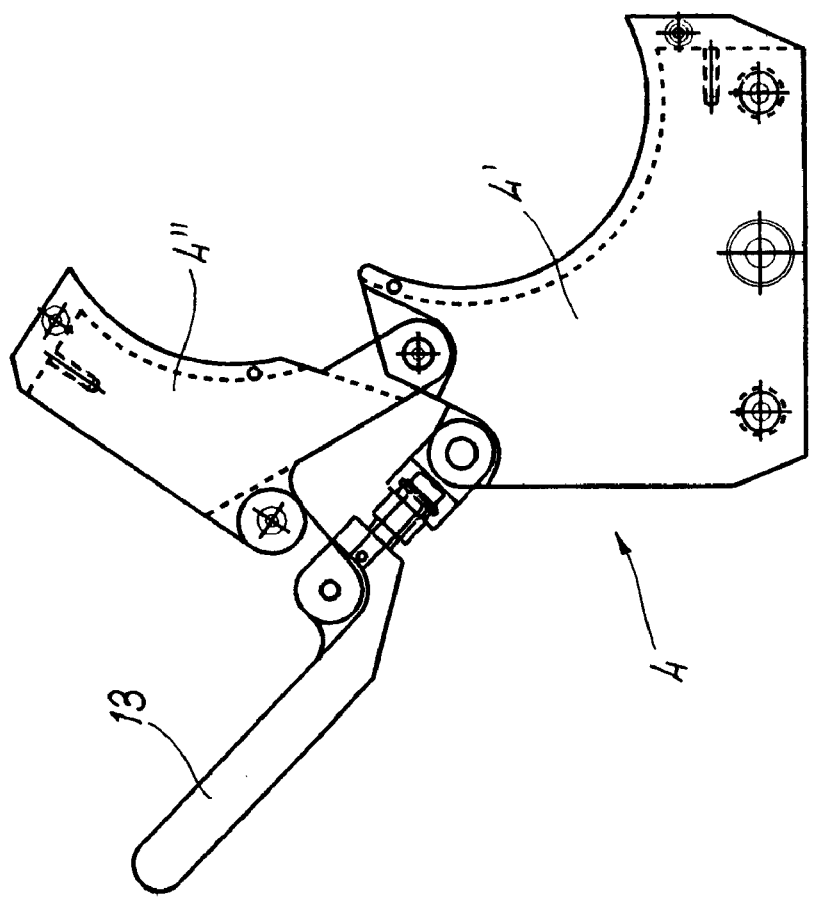
FIG. 7 shows a vise of the press according to the invention.

In FIG. 7 it is shown a vise 4, 5 or 21, that is opened, without adapters, and with the two semi-parts 4', 4" opened.

Figure 8:
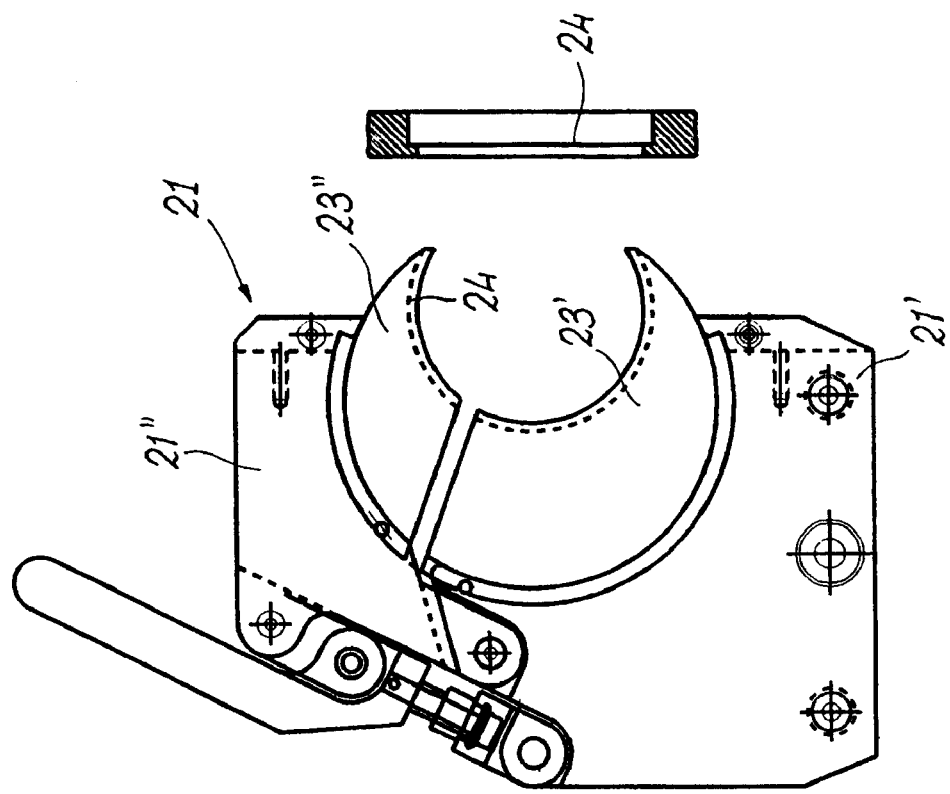
FIG. 8 shows a vise of the press according to the invention ready in a further embodiment.

Coming now to observe FIG. 8, excluding the movable base 3 from the spring effect of the system 19, by the pin 20 (FIGS. 1 and 4), suitable reductions 23', 23" are used on the inner vise 21 mounted on said base 3, to be able to carry out socket or pocket weldings. In this case, reduction 23', 23" provides a shoulder 24 for the abutment of the socket on which the two tubes (not shown) have to be welded.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Multi-functional press for welding plastic tubes and joints, particularly polyethylene, polypropylene, polybutene and polyvinyldifluoride tubes and joints, comprising a first fixed base and a second base, movable with respect to said first base along sliding guides, a first vise group, mounted on said first base and a second vise group mounted on said second base (3), characterised in that it further provides a thermo-element, provided on a guide parallel with respect to said first and second base, and coupled with said guide in such a way to be provided in a working position between said vise groups, and in a rest position, completely out of the operation field of said vise groups, and in a lowered position with respect to the operation field of said vise groups, and in that said vise groups are mounted on the relevant fixed and movable base, in such a way to be also able to rotate and to take every orientation with respect to the base axis.

2. Multi-functional press for welding plastic tubes and joints according to claim 1, characterised in that on said guide parallel to said first and second base a milling machine can be provided, in the same way as said thermo-element.

3. Multi-functional press for welding plastic tubes and joints according to one of the preceding claims, characterised in that said vise groups are mounted on the relevant fixed and movable base, in such a way to be also able to rotate and to take every orientation with respect to a base axis, means being provided indicating the orientation of the vise group with respect to the relevant base.

4. Multi-functional press for welding plastic tubes and joints according to claim 1, characterised in that said vise groups each have a pair of vises, said vises of each group being movable each other to vary the distance between the two vises of each base.

5. Multi-functional press for welding plastic tubes and joints according to claim 1, characterised in that said vise group mounted on said movable bases provides a single vise, and a drilling machine, provided at the back with respect to the vise, to drill a main tube on which a derivation is welded.

6. Multi-functional press for welding plastic tubes and joints according to claim 1, characterised in that every vise of said groups provides two openable and closable asymmetric parts, and each of said asymmetric parts being provided an eccentric adapter, to adapt to a specific tube under work, maintaining the surface of the tube in a constant and well aligned position.

7. Multi-functional press for welding plastic tubes and joints according to claim 1, characterised in that in case a socket welding is carried out, an adapter suitable to support the socket or pocket element is provided on an inner vise of the vise group provided on the movable base.

8. Multi-functional press for welding plastic tubes and joints according to claim 1, characterised in that approaching and moving away means are provided on said fixed base, for moving the movable base, as well fixing means will be provided to fix the movable base in the proper position, buckling elastic means being provided on said movable base, said means determining the loading pressure for the head weldings, and pin means to exclude said buckling elastic means when carrying out socket or pocket weldings.

9. Multi-functional press for welding plastic tubes and joints according to claim 1, characterised in that said thermo-element is a mirror or poli-fusion element, provided with a thermocouple electronic control, said thermo-element being interchangeable without being necessary to replace the support and the control system.

10. Multi-functional press for welding plastic tubes and joints according to claim 1, characterised in that the press provides a drawer to place the fittings.

* * * * *